US006784984B2

(12) United States Patent
Parente et al.

(10) Patent No.: US 6,784,984 B2
(45) Date of Patent: Aug. 31, 2004

(54) METHOD AND APPARATUS FOR IMPROVED TESTING OF OPTICAL CIRCUIT MODULES

(75) Inventors: Ronald N. Parente, Bolton, MA (US); Paul Boyd, Oak Creek, WI (US); David F. Botros, Burlington, MA (US); Peter K. Lison, Methuen, MA (US)

(73) Assignee: Nortel Networks, Ltd., St. Laurent (CA)

( * ) Notice: Subject to any disclaimer, the term of this patent is extended or adjusted under 35 U.S.C. 154(b) by 10 days.

(21) Appl. No.: 10/112,210

(22) Filed: Mar. 29, 2002

(65) Prior Publication Data

US 2003/0184734 A1 Oct. 2, 2003

(51) Int. Cl.[7] .............................................. G01N 21/00
(52) U.S. Cl. ...................................................... 356/73.1
(58) Field of Search .................. 356/73.1; 324/537–540, 324/642, 628, 616; 385/24, 45; 250/227.15, 227.23; 359/110, 173

(56) References Cited

U.S. PATENT DOCUMENTS 6,201,599 B1 * 3/2001 Ryu et al. .................. 356/73.1
6,259,256 B1 * 7/2001 Walling ...................... 324/539

* cited by examiner

Primary Examiner—Tu T. Nguyen
(74) Attorney, Agent, or Firm—John C. Gorecki, Esq.

(57) ABSTRACT

A novel method and apparatus has been developed for testing optical circuit modules. More particularly, with the present invention, a given test pack is adapted to "simultaneously" test a plurality of DUT's, by simultaneously apply a given optical signal to each of the plurality of DUT's and allowing each of the DUT's to simultaneously undergo its own testing; the test pack then serially queries each of the DUT's to obtain test results and, if desired, can provide feedback to one or more of the DUT's, whereby the DUT's can be calibrated with the assistance of the test pack. In one preferred form of the invention, all of the plurality of DUT's simultaneously undergoing testing on a given test pack are housed in a single environmental enclosure, permitting all of the DUT's to be simultaneously brought "up to temperature" so as to increase testing throughput.

13 Claims, 1 Drawing Sheet

METHOD AND APPARATUS FOR IMPROVED TESTING OF OPTICAL CIRCUIT MODULES

FIELD OF THE INVENTION

This invention relates to optical circuit modules in general, and more particularly to methods and apparatus for testing the same.

BACKGROUND OF THE INVENTION

Optical circuit modules, such as those used in fiberoptic telecommunications products, typically require substantial testing (including characterization) during manufacture and before they are released to the field.

Standard practice for the testing of optical circuit modules, and in particular for the testing of the optical components of those modules, is for a single device-under-test ("DUT") to be examined at a time, using a dedicated set of test equipment.

Unfortunately, however, the dedicated set of test equipment (or "test pack") is generally a relatively complex array of instrumentation controlled by a dedicated computer or controller. As a result, the cost of each test pack typically costs between about $250,000 and $800,000. Furthermore, depending on the specific tests which are to be run on the DUT, each DUT typically requires between about 15 minutes to several hours to complete its testing. Thus it will be seen that manufacturers who must produce large numbers of these optical circuit modules must invest large amounts in replicating each expensive test pack to ensure sufficient product throughput.

In addition to the foregoing, in many cases the DUT should, ideally, be tested under a variety of different operating temperatures. This generally requires that the DUT be brought to (and stabilized at) a first temperature, tested, then brought to a second temperature, tested, etc. until the DUT has been tested through the full range of temperatures desired. In view of the substantial delays generally associated with bringing the DUT "up to temperature" (e.g., it can often take up to 30 minutes to bring the DUT to, and stabilize the DUT at, a given temperature), this can dramatically increase the time necessary to test each DUT and reduce the throughput for each test pack, thereby reducing productivity, requiring the provision of additional expensive test packs, etc.

SUMMARY OF THE INVENTION

In response to these issues, a novel method and apparatus has been developed for testing optical circuit modules. More particularly, with the present invention, a given test pack is adapted to "simultaneously" test a plurality of DUT's, by simultaneously apply a given optical signal to each of the plurality of DUT's and allowing each of the DUT's to simultaneously undergo its own testing; the test pack then serially queries each of the DUT's to obtain test results and, if desired, can provide feedback to one or more of the DUT's, whereby the DUT's can be calibrated with the assistance of the test pack.

In one preferred form of the invention, all of the plurality of DUT's simultaneously undergoing testing on a given test pack are housed in a single environmental enclosure, permitting all of the DUT's to be simultaneously brought "up to temperature" so as to increase testing throughput.

BRIEF DESCRIPTION OF THE DRAWINGS

These and other objects and features of the present invention will be more fully disclosed in the following detailed description of the preferred embodiments of the invention, which are to be considered together with the accompanying drawing wherein like numbers refer to like parts and further wherein.

BRIEF DESCRIPTION OF THE PREFERRED EMBODIMENTS

Figure 1:
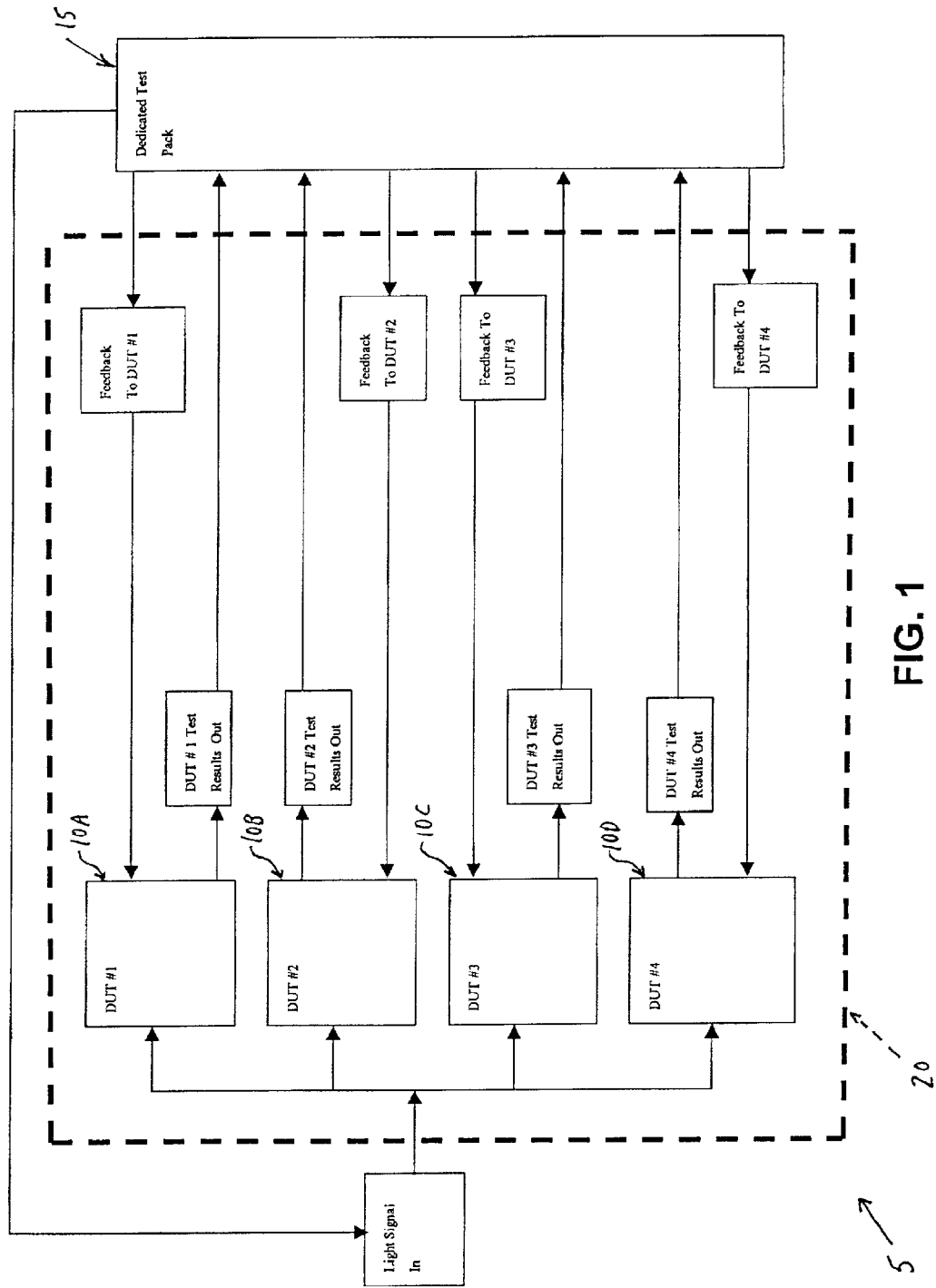
FIG. 1 is a schematic view showing one preferred form of the invention.

Looking now at FIG. 1, there is shown a novel apparatus 5 for testing optical circuit modules. Apparatus 5 is adapted to test a plurality of devices-under-test ("DUT's") 10A, 10B, 10C, 10D, etc. using a dedicated test pack 15. Four DUT's 10 are shown in FIG. 1, however, this number is intended to be merely exemplary; more or less DUT's 10 may also be provided.

DUT's 10 may comprise any one of a variety of optical circuit modules needing to be tested (including characterized) before being released to the field. By way of example but not limitation, each of the DUT's 10 may comprise a tunable Fabry-Perot filter or tunable vertical cavity surface emitting laser ("VCSEL") of the sort disclosed in pending prior U.S. patent application Ser. No. 09/105,399, filed Jun. 26, 1998 by Parviz Tayebati et al. for MICROELECTROMECHANICALLY TUNABLE, CONFOCAL, VERTICAL CAVITY SURFACE EMITTING LASER AND FABRY-PEROT FILTER, and in pending prior U.S. patent application Ser. No. 09/543,318, filed Apr. 5, 2000 by Peidong Wang et al. for SINGLE MODE OPERATION OF MICROELECTROMECHANICALLY TUNABLE, HALF-SYMMETRIC, VERTICAL CAVITY SURFACE EMITTING LASERS, and in pending prior U.S. patent application Ser. No. 09/750,434, filed Dec. 28, 2000 by Peidong Wang et al. for TUNABLE FABRY-PEROT FILTER AND TUNABLE VERTICAL CAVITY SURFACE EMITTING LASER, which three aforementioned patent applications are hereby incorporated herein by reference. Alternatively, DUT's 10 may comprise other types of optical components. And in many cases DUT's 10 may comprise multiple optical components. DUT's 10 may also include associated onboard electronic controllers and logic forming the complete optical circuit module which is to be tested.

Dedicated test pack 15 may be any dedicated test pack of the sort known in the art, e.g., it is typically configured to apply light of varying wavelengths and power levels to each DUT 10 and to receive the test results generated by each DUT 10. By way of example but not limitation, test pack 15 may be constructed so as to step through a range of different wavelengths and, for each wavelength, step through a range of different power levels. Test pack 15 is also configured to receive the test results of each DUT 10 and to check the same, e.g., for wavelength, power level, optical signal to noise ratio ("OSNR"), etc. If desired, test pack 15 may also be configured so as to provide feedback to one or more of the DUT's 10, whereby the DUT's may be calibrated or otherwise prepared with the assistance of test pack 15.

In accordance with the present invention, test pack 15 is adapted to "simultaneously" test a plurality of DUT's, by simultaneously applying a given optical signal to each of the plurality of DUT's and allowing each of the DUT's to simultaneously undergo its own testing. This may be done by passing an output signal from test pack 15 through a beam splitter or the like so as to create a plurality of parallel input signals for DUT's 10. DUT's 10 then process these input signals simultaneously, in parallel, so as to yield specific test results. Test pack 15 then serially queries each of the DUT's individually to obtain test results and, if desired, can provide feedback to one or more of the DUT's, whereby the DUT's can be calibrated with the assistance of test pack 15.

In one preferred form of the invention, test pack 15 steps through a range of different wavelengths and, for each wavelength, steps through a range of different power levels, with each particular combination of wavelength and power level being applied simultaneously, in parallel, to each of DUT's.

Preferably, test pack 15 serially queries each of the DUT's for a given combination of wavelength and power level, before advancing to the next combination of wavelength and power level.

In one preferred form of the invention, all of the plurality of DUT's 10 simultaneously undergoing testing on a given test pack 15 are housed in a single environmental enclosure 20, thereby permitting all of the DUT's to be simultaneously brought "up to temperature" so as to increase testing throughput.

More particularly, in one preferred form of the invention, the interior of the environmental enclosure is brought up to a first temperature $T_1$, so that all of DUT's 10 are at temperature $T_1$, and then test pack 15 steps through a range of different wavelengths and, for each wavelength, steps through a range of different power levels. Again, each particular combination of wavelength and power level is applied simultaneously, in parallel, to each of the DUT's inside environmental enclosure 20, with test pack 15 serially querying each of the DUT's for a given combination of wavelength and power level before advancing to the next combination of wavelength and power level. Then the environmental enclosure is brought to a second temperature $T_2$, so that all of the DUT's 10 are at temperature $T_2$, and then test pack 15 steps through a range of different wavelengths and, for each wavelength, steps through a range of different power levels, with test pack 15 again serially querying each of the DUT's for a given wavelength and power level combination before moving on to the next combination of wavelength and power level. This process is repeated for all of temperatures of interest.

Preferably, test pack 15 can also provide feedback to each of the DUT's 10 based on the test results monitored by test pack 15.

In practice, it has been found that the number of DUT's which may be tested at one time is dependent on a number of factors, including the strength of the light signal split between the various DUT's, the nature of the tests which are to be run, the physical size of the optical circuit modules and environmental enclosure 20, etc. In practice, it has been found that up to 22 different DUT's may be quickly and easily tested, across a variety of different wavelengths, power levels and temperatures, using the novel apparatus 5.

What is claimed is:

1. Apparatus for testing a plurality of optical circuit modules, said apparatus comprising:
    a test pack including an optical signal generator adapted to simultaneously apply an optical signal to an input of each of the plurality of optical circuit modules so as to allow each of the optical circuit modules to simultaneously undergo its own testing in response to the optical signal, and the test pack having an input coupled to the output of each of the plurality of optical circuit modules and the test pack being operative to serially query each of the optical circuit modules to obtain test results.

2. Apparatus according to claim 1 wherein the test pack is adapted to provide a feedback signal to at least one of the plurality of optical circuit modules based upon the test results obtained by the test pack corresponding to the particular optical circuit module.

3. Apparatus according to claim 1 wherein the the optical signal generator is adapted to step through a range of different wavelengths and, for each wavelength, step through a range of different power levels, with each particular combination of wavelength and power level being applied simultaneously, in parallel, to each of the optical circuit modules.

4. Apparatus according to claim 3 wherein the test pack is adapted to serially query each of the optical circuit modules, for a given set of input test conditions, before advancing to the next set of input conditions.

5. Apparatus according to claim 4 wherein a set of input test conditions comprises a wavelength and a power level.

6. Apparatus for testing a plurality of optical circuit modules, said apparatus comprising:
    a test pack including an-optical signal generator adapted to simultaneously apply an optical signal to an input of each of the plurality of optical circuit modules so as to allow each of the optical circuit modules to simultaneously undergo its own testing;
    the test pack coupled to the output of each of the plurality of optical circuit modules and further operative to serially query each of the optical circuit modules to obtain test results, wherein the test pack is adapted to provide a feedback signal to at least one of the plurality of optical circuit modules based upon the test results obtained by the test pack corresponding to the particular optical circuit modules;
    wherein the test pack is adapted to step through a range of different wavelengths and, for each wavelength, step through a range of different power levels, with each particular combination of wavelength and power level being applied simultaneously, in parallel, to each of the optical circuit modules;
    wherein the pack is adapted to serially query each of the optical circuit modules, for a given set of input test conditions, before advancing to the next set of input conditions;
    wherein a set of input test conditions comprises a wavelength and a power level; and
    the test pack further comprising an environmental enclosure, and further wherein all of the optical circuit modules simultaneously undergo testing on the test pack are housed in that environment enclosure.

7. Apparatus according to claim 6 wherein the apparatus is adapted so that the interior of the environmental enclosure is brought to a first temperature and then the test pack steps through a range of different wavelengths and, for each wavelength, steps through a range of different power levels; and then the interior of the environmental enclosure is brought to a second temperature and then the test pack steps through a range of different wavelengths and, for each wavelength, steps through a range of different power levels.

8. A method for testing a plurality of optical circuit modules, said method comprising:
    generating an optical signal;
    simultaneously applying the optical signal to each of the plurality of optical circuit modules so as to allow each of the optical circuit modules to simultaneously undergo its own testing; and
    serially querying each of the optical circuit modules to obtain test results.

9. A method according to claim 8 further comprising the step of providing a feedback signal to at least one of the optical circuit modules based upon the test results obtained by the test pack.

10. A method according to claim 8 wherein the optical signal is stepped through a range of different wavelengths and, for each wavelength, stepped through a range of different power levels, with each particular combination of wavelength and power level being applied simultaneously, in parallel, to each of the optical circuit modules.

11. A method according to claim 10 wherein each of the optical circuit modules is queried, for a given combination of wavelength and power level, before advancing to the next combination of wavelength and power level.

12. A method for testing a plurality of optical circuit modules, said method comprising:

generating an optical signal;

simultaneously applying the optical signal to each of a plurality of optical circuit modules so as to allow each of the optical circuit modules to simultaneously undergo its own testing; and serially querying each of the optical circuit modules to obtain test results wherein the optical signal is stepped through a range of different wavelengths and, for each wavelength, stepped through a range of different power levels, with each particular combination of wavelength and power level being applied simultaneously, in parallel, to each of the optical circuit modules;

wherein each of the optical circuit modules is queried for a given combination of wavelength and power level, before advancing to the next combination of wavelength and power level;

wherein all of the optical circuit modules simultaneously undergoing testing on the test pack are housed in a single environmental enclosure.

13. A method according to claim 12 wherein the interior of the environmental enclosure is brought to a first temperature and then the optical signal steps through a range of different wavelengths and, for each wavelength, steps through a range of different power levels; and then the interior of the environmental enclosure is brought to a second temperature and then the optical signal steps through a range of different wavelengths and, for each wavelength, steps through a range of different power levels.

* * * * *